2,874,023 
 Patented Feb. 17, 1959

2,874,023

STATIC-RESISTANT HYDROPHOBIC RESIN COMPOSITION, SHAPED ARTICLE THEREOF AND METHOD FOR MAKING THE LATTER

Andrew T. Walter, South Charleston, W. Va., assignor to Union Carbide Corporation, a corporation of New York No Drawing. Application July 27, 1954
Serial No. 446,162

12 Claims. (Cl. 18—54)

This invention relates to the production of filaments, fibers, yarns, films, woven, knitted and felted fabrics and other articles made from, or containing, hydrophobic synthetic resins, such as the water-insoluble vinyl resins and acrylonitrile-containing resins, which resins have present therein components that serve to inhibit or reduce the tendency of such articles to accumulate surface charges of static electricity during the production thereof and the subsequent treatment of such articles in connection with the usual finishing operations, and particularly during the normal service life of the articles. The invention has especial utility in connection with the production of static-resistant articles suitable for the manufacture of wearing apparel, industrial fabrics, and a wide variety of other articles from vinyl resins made by the polymerization of acrylonitrile or vinyl chloride, alone or in admixture with another vinyl compound or compounds.

For many years manufacturers of textile articles made from hydrophobic vinyl resins and the like have been faced with the serious problem that such articles tend to accumulate surface charges of static electricity, with the attendant hazards and discomfort incurred by those using them. Many attempts have been made to solve this static problem by the application to the resin article of surface coatings of various materials. Invariably, however, the static protection obtained by the surface treatment of the article has been only temporary, and the protective coating does not withstand the usual washing and dry cleaning operations or the normal abrasion during use. There are but few so-called antistatic agents available which, even if properly applied to a fabric, will be retained through the first dry cleaning or laundering.

Among the more important objects of the present invention are: the production of a static-resistant hydrophobic resin composition capable of forming spinning solutions in certain readily available spinning solvents; to provide such compositions that can be wet- or dry-spun to yield filaments, yarns and the like which are highly static-resistant, both as produced and during their service life; and the production of novel, hydrophobic resin compositions containing therein an antistatic agent that is effective substantially throughout the active service life of the article made from such composition. These and other objects will be apparent from the following description of the invention.

In accordance with the invention, highly static-resistant hydrophobic resin compositions capable of being dispersed in volatile spinning solvents and of being shaped into articles that are relatively thin in at least one dimension by an extrusion or a casting operation are made by preparing a solution or dispersion of such a hydrophobic resin and certain novel hydroxyethylated or hydropropylated polyvinyl alcohols hereinafter described in a suitable organic liquid which is a mutual solvent for the said resin and the hydroxyalkylated polyvinyl alcohol. The resultant solution then is spun by a well-known wet-spinning or dry-spinning process into commercially useful textile fibers which, both in the as-spun condition and after the usual stretching, annealing, dyeing and/or other processing steps commonly employed to improve the properties of the spun fibers, show a marked and substantially permanent resistance to the accumulation of surface charges of static electricity. While the invention has its principal utility for the production of static-resistant textile materials from resinous hydrophobic polyacrylonitriles, polyvinyl chlorides, polyvinylidene chlorides, polystyrenes, and copolymers of acrylonitrile with other monovinyl compounds copolymerizable therewith, such as vinyl chloride, vinyl acetate, vinylidene chloride, styrene, and mixtures of vinyl chloride and vinylidene chloride, and copolymers of vinyl chloride and vinyl acetate, it is particularly useful in connection with the production or treatment of textile articles made from acrylonitrile-containing polymers. Consequently, the following examples serve principally to illustrate this form of the invention.

The solvent employed will depend upon the particular resin from which the article is to be produced. Thus, in the case of polyacrylonitriles, dimethylformamide and dimethylacetamide are useful mutual solvents. In the case of articles made from acrylonitrile-vinyl chloride copolymers containing up to around 60% of vinyl chloride, acetone and/or acetonitrile is useful as the mutual solvent; while similar copolymers containing up to 75% of acrylonitrile can be dissolved in acetonitrile, dimethylformamide or dimethylacetamide as the mutual solvent. Benzene is a suitable mutual solvent in the case of polystyrene and styrene-acrylonitrile copolymers.

The hydroxyalkylated polyvinyl alcohols useful in the practice of the invention are those made by reacting ethylene oxide, propylene oxide, or a mixture thereof, with a medium- or a high-molecular weight polyvinyl alcohol, the said hydroxyalkylated polyvinyl alcohol containing between around 1.5 parts and around 20 parts of the alkylene oxide residues or hydroxyalkyl groups per part of the polyvinyl alcohol residue, by weight, and preferably containing from around 3 to around 14 or more of the alkylene oxide residues per part of the polyvinyl alcohol residue. Hydroxyethyl polyvinyl alcohols having such weight ratios in the range from 7 to 1 to 14 to 1 are particularly suitable for incorporation in copolymers of acrylonitrile and vinyl chloride containing between 20% and 55% by weight of acrylonitrile, since acetone is an excellent mutual solvent both for the resin and for this antistatic agent. In the production of compositions from vinyl chloride-acrylonitrile copolymers containing more than 55% of acrylonitrile, where acetonitrile is the commonly used spinning solvent, hydroxyethyl polyvinyl alcohols having an alkylene oxide to polyvinyl alcohol weight ratio as low as around 3 to 1 can be used. Those having ratios as low as 1.5 can be used in admixtures with such resins to yield compositions that can be spun or otherwise worked from solutions thereof in dimethylformamide as mutual solvent.

The hydroxyalkyl polyvinyl alcohols useful as antistatic agents in this invention can be made in various manners. In one process ethylene oxide, propylene oxide, or a mixture thereof is reacted with a polyvinyl alcohol of medium or high average molecular weight in the ratio of from about 1.5 to about 13 parts or more of the alkylene oxide per part of the polyvinyl alcohol, all parts by weight, at temperatures in the range between about 80° C. and about 150° C., and corresponding autogenous pressures, in the absence of any added catalyst. A process of this general type is described in the co-pending application, Serial No. 403,457 of A. E. Broderick, filed January 11, 1954 (now abandoned.) Useful hydroxyalkyl polyvinyl alcohols also can be produced by reacting at least 1.5 parts of an alkylene oxide, preferably ethylene oxide, per part of such a polyvinyl alcohol, all parts by weight, at temperatures within the range from about 10° C. to about 50° C., in the presence of an alkaline catalyst, while dispersed in a liquid which is a solvent for the hydroxyethyl polyvinyl alcohol thus produced. A process of this general type is described in the pending application, Serial No. 392,769, of A. E. Broderick, filed November 17, 1953.

The addition to such hydrophobic resins of around 5% or more of these hydroxyalkyl polyvinyl alcohols, and preferably around 7% to around 15%, based on the total weight of the latter and the resin, provides compositions that can be dispersed in a mutual solvent prior to a spinning or other reshaping operation. Such dispersions yield spun fibers and other shaped articles having substantially permanent static resistance. Indeed, textiles made from fibers produced by the spinning of these solutions in well-known manner have retained their static resistance after as many as 150 home launderings, and after repeated dry cleanings.

The optimum range of hydroxyethyl polyvinyl alcohol content of the resin composition varies somewhat with the resin forming the base of the composition. Thus, in the case of resinous copolymers of acrylonitrile and vinyl chloride containing 68% of acrylonitrile, excellent static protection is secured when the hydroxyethyl polyvinyl alcohol amounts to around 6% to 12% of the weight of the spun fiber, substantially free from the spinning solvent, acetonitrile, whereas in the case of fibers and yarns made from copolymers of acrylonitrile and vinyl chloride containing around 40% of acrylonitrile, using acetone as the mutual solvent, the optimum concentration of the hydroxyethyl polyvinyl alcohol to obtain yarns having good permanent static protection together with good yarn strength and high temperature shrinkage resistance is usually within the range between around 7% and 15% of the weight of the fiber. For securing optimum static protection for hydrophobic terpolymers containing around 68% of acrylonitrile, around 22% of vinyl chloride and around 10% of vinylidene chloride, around 6% to 12% of the aforesaid antistatic agent, based upon the fiber weight, generally is desirable.

Similarly, compositions prepared by the addition, respectively, (1) to polyacrylonitrile dissolved in dimethylformamide, (2) to polystyrene dissolved in benzene, and (3) to copolymers of vinyl chloride and vinyl acetate dissolved in acetone, of 15% by weight of hydroxyethyl polyvinyl alcohols having an ethylene oxide to polyvinyl alcohol weight ratio of about 10 to 1, yielded cast films which, upon removal of the solvents by heating for 30 minutes at 100° C. to 150° C., were substantially static-resistant without noticeable loss of their desirable mechanical properties (see Table X).

The hydroxyalkyl polyvinyl alcohols effective in this invention are not confined to the hydroxyethyl derivatives since the former may contain as much as 4 parts of propylene oxide and 5.9 parts of ethylene oxide for each part by weight of vinyl alcohol in the polymer; and the introduction of 15% of such a product into a hydrophobic vinyl resin has yielded products having excellent static resistance.

The textile products made from hydrophobic resins containing the antistatic agents of this invention also have been found to have improved affinity for acid-type, acetate-type and vat-type dyestuffs. As a result, lower dyeing temperatures and lower dye concentrations can be used to obtain selected dye shades when these antistatic agents are present. Concurrently, the dyeing is much more level.

The following examples will serve to illustrate the invention.

EXAMPLE 1

75 grams of the reaction product of ethylene oxide and polyvinyl alcohol, which product contains ethylene oxide and polyvinyl alcohol in the weight ratio of 9 to 1, was dissolved in 1500 grams of acetonitrile cooled to 0° C. Then 425 grams of an acrylonitrile-vinyl chloride resin containing about 40% of the acrylonitrile in the polymer and 10 grams of dioctyl tin maleate as a light and heat stabilizer were added and mixed to form a resin slurry. The polyvinyl alcohol had an average molecular weight such that a 4% aqueous solution thereof had an absolute viscosity at 20° C. of 13 to 21 centipoises. The temperature of the slurry was raised with agitation to about 50° to 60° C., thereby solvating the resin and obtaining a homogeneous solution. The latter was heated in a closed vessel to about 70° to 80° C., filtered under pressure, and metered to a spinnerette. The resultant filaments were coagulated in a 50° C. water bath containing around 10% of acetonitrile, and then was collected and the yarn spooled and dried for several hours at 70° C. in air. Two ends of the yarn were stretched 1000% within a steam stretching tube at 122° C., twisted and wound into a package, and the package heat-treated for six hours at 110° C. while permitting free shrinkage of the yarn. The resulting 80-filament, 255 denier yarn containing 15% of the hydroxyethyl polyvinyl alcohol had the physical properties listed in Table I. Other yarns similarly prepared but having hydroxyethyl polyvinyl alcohol contents of 10% and 20%, also are listed for comparison.

Table I

| Percent HEPVA | Tensile strength, grams/denier | Elongation, percent | Percent shrinkage in— | |
|---|---|---|---|---|
| | | | Boiling water | 150° C. Oil |
| 10 | 3.2 | 26 | 1.8 | 40 |
| 15 | 3.0 | 26 | 1.3 | 43 |
| 20 | 3.0 | 26 | 1.3 | 43 |

The antistatic properties imparted to these various yarns by the process are recited in Table II. The test methods employed are described in detail hereinafter.

Table II

| Percent HEPVA | Number of times laundered | Electrical resistivity, (ohm cms.) | Charge generation, volts |
|---|---|---|---|
| 10 | 20 | $3.1 \times 10^9$ | −640 |
| 15 | 20 | $1.8 \times 10^9$ | −350 |
| 20 | 20 | $1.9 \times 10^9$ | −100 |
| 0 | 1 | $1.0 \times 10^{11}$ | >−1,000 |

EXAMPLE 2

Following this procedure described in Example 1, but using a different hydroxyalkyl polyvinyl alcohol herein described, and using acetone as the solvent instead of acetonitrile, a series of vinyl resin yarns were prepared using the vinyl resin described in Example 1, in conjunction with 0%, 5%, 10% and 15%, respectively, by weight, of an hydroxyalkyl polyvinyl alcohol containing ethylene oxide, propylene oxide and polyvinyl alcohol in the weight ratio of 7:3:1, the average molecular weight of the polyvinyl alcohol being such that the absolute viscosity of a 4% solution of the resin in water at 20° C. was between 6 and 12 cps.

The static-resistant properties of these yarns are recited in Table III.

Table III

| Percent HEPVA | Number of times laundered | Electrical resistivity, (ohm cms.) | Charge generation, volts |
|---|---|---|---|
| 0 | 20 | $8.7 \times 10^{10}$ | >1,000 |
| 5 | 50 | $4.8 \times 10^{10}$ | −670 |
| 10 | 50 | $1.1 \times 10^{10}$ | −100 |
| 15 | 50 | $6.4 \times 10^9$ | −350 |

EXAMPLE 3

Following the procedure described in Example 1, but using acetone as the spinning solvent, a series of yarns made from the vinyl resin of that example, and containing, respectively, 5%, 10%, 15% and 20% of an hydroxyalkyl polyvinyl alcohol prepared by reacting 5.9 mols of ethylene oxide and 4 mols of propylene oxide per mol of polyvinyl alcohol, calculated as vinyl alcohol, the polyvinyl alcohol being prepared from a polyvinyl acetate having a Ford cup viscosity of 17 to 21 seconds at 25° C. using a 20% solution of the resin and a Ford cup having a No. 4 tip.

The yarns thus produced had the static-resistant properties set forth in Table IV.

Table IV

| Percent reaction product | Number of times laundered | Electrical resistivity, (ohm cms.) | Charge generation, volts |
|---|---|---|---|
| 5 | 20 | $3.7 \times 10^{10}$ | $>-1,000$ |
| 15 | 50 | $3.6 \times 10^{8}$ | $-260$ |
| 20 | 50 | $4.0 \times 10^{7}$ | $<100$ |

EXAMPLE 4

Following the procedure described in Example 1, a series of yarns were produced from an acrylonitrile-vinyl chloride copolymer resin containing 40% of acrylonitrile together with 5% and 10%, respectively, of an hydroxyethyl polyvinyl alcohol, based on the combined weight of the resin and the HEPVA. The latter contained 20 parts of ethylene oxide per part of polyvinyl alcohol, by weight. The yarns thereby produced had the static-resistant properties shown in Table V. The properties of a control sample containing no antistatic agent appears therein for comparison.

Table V

| Percent HEPVA | Number of times laundered | Electrical resistivity, (ohm cms.) | Charge generation, volts |
|---|---|---|---|
| 5 | 40 | $1.1 \times 10^{10}$ | $-830$ |
| 10 | 100 | $6.6 \times 10^{9}$ | $-430$ |
| 0 | 1 | $1.0 \times 10^{11}$ | $>-1,000$ |

EXAMPLE 5

Following the procedure described in Example 1, a series of yarns were prepared from a resin composition containing, respectively, 0%, 10%, and 15% of an hydroxyethyl polyvinyl alcohol containing 13.5 parts of ethylene oxide to one part of polyvinyl alcohol, the latter being approximately the same as that recited in Example 1. The resin forming the yarn base was a terpolymer of acrylonitrile, vinyl chloride and vinylidene chloride containing 67% of acrylonitrile, 21% of vinyl chloride and 12% of vinylidene chloride.

The static-resistant yarns thus made have the physical properties recited in Table VI.

Table VI

| Percent HEPVA | Tensile strength, grams/denier | Elongation, percent | Percent shrinkage in— | |
|---|---|---|---|---|
| | | | Boiling water | 200° C. Oil |
| 0 | 4.59 | 15.5 | 2.8 | 13.9 |
| 10 | 4.17 | 16.5 | 2.8 | 17.6 |
| 15 | 4.83 | 17.5 | 2.2 | 16.8 |

A comparison of the static resistance of these yarns is set forth in Table VII.

Table VII

| Percent HEPVA | Number of times laundered | Electrical resistivity, (ohm cms.) | Charge generation, volts |
|---|---|---|---|
| 0 | 1 | $8.1 \times 10^{10}$ | $>-1,000$ |
| 10 | 50 | $1.3 \times 10^{8}$ | $<100$ |
| 15 | 50 | $1.0 \times 10^{7}$ | $<100$ |

EXAMPLE 6

A series of spinning solutions in acetonitrile were made of a resinous copolymer of acrylonitrile and vinyl chloride containing 68% of acrylonitrile. To such solutions were added, respectively, 0%, 5%, 10% and 15% of the hydroxyalkyl polyvinyl alcohol described in Example 3, based upon the total weight of the resin and hydroxyalkyl polyvinyl alcohol, each of the solutions containing 25% of total solids. Yarns spun from these solutions were coagulated in a water bath containing 10% of acetonitrile and held at 66° C., washed, dried, dry-stretched 500% at 164° C., and annealed at 200° C. for 0.5 second while allowing a 12% shrinkage. The physical properties of the resultant 100-filament, 275 denier yarns thus prepared are listed in Table VIII. The static properties of the foregoing yarns are presented in Table IX. Similar results also were secured by the treatment of the yarns after they had been dyed for 90 minutes in boiling dyebaths, respectively, containing Xylene Milling Blue Bl, Colour Index No. 833, a typical acid-type dyestuff.

Table VIII

| Percent HEPVA | Tensile strength, grams/denier | Elongation, percent | Percent shrinkage in— | |
|---|---|---|---|---|
| | | | Boiling water | 180° C. Oil |
| 0 | 3.50 | 20.5 | 4.4 | 11.2 |
| 5 | 3.11 | 19.5 | 4.2 | 13.0 |
| 10 | 3.28 | 20.5 | 4.0 | 11.9 |
| 15 | 3.32 | 20.5 | 4.4 | 14.8 |
| 20 | 3.16 | 20.0 | 5.1 | 21.3 |

Table IX

| Percent HEPVA | Number of times laundered | Electrical resistivity, (ohm cms.) | Charge generation, volts |
|---|---|---|---|
| 0 | 5 | $1.2 \times 10^{11}$ | $>1,000$ |
| 5 | 20 | $4.4 \times 10^{10}$ | 870 |
| 10 | 50 | $3.5 \times 10^{8}$ | 200 |
| 15 | 50 | $1.3 \times 10^{8}$ | 100 |
| 20 | 50 | $1.3 \times 10^{8}$ | 100 |

EXAMPLE 7

This example illustrates the effectiveness as internal antistatic agent of the hydroxyalkyl polyvinyl alcohols of the invention with a wide range of hydrophobic resins. In each of the experiments indicated in Table X, 12.75 grams of the resin, 2.25 grams of an hydroxyethyl polyvinyl alcohol having ethylene oxide residues and polyvinyl alcohol residues in a ratio of approximately 10 to 1, a hydroxyl content of 3.44%, and having a specific viscosity at 20° C. of 0.162 for a 0.2% solution in water, and 85 cc. of the indicated solvent were mixed in glass containers and heated to 50°–80° C. to produce a uniform solution. Thin films approximately 4 mils thick were cast on plate glass and dried at 100°–150° C. for 0.5 hour to remove residual solvent. For comparison, similar films also were prepared from each resin without the hydroxyethyl polyvinyl alcohol. After drying, the films were stripped from the glass plate and wiped clean with diethyl ether. Approximately 6" x 6" samples of each film were rubbed vigorously over clean wool flannel, and the charge generation and dirt pickup tests were conducted in the manner herein indicated for textile material. The static properties indicated in this table were obtained at 50° relative humidity and 76° F. on the dried films.

*Table X*

| Polymer | Solvent | Control resin charge generation, volts | Resin+15% antistatic agent charge generation, volts |
|---|---|---|---|
| A | Dimethylformamide | >−1,000 | +250 |
| B | do | >−1,000 | <200 |
| C | do | >−710 | <200 |
| D | do | >+1,000 | <200 |
| E | Benzene | +500 | <200 |
| F | Acetone | −500 | <200 |
| G | {33.6 grams acetone, 40.0 grams cyclohexanone} | >−1,000 | <200 |

Polymer A is a copolymer of acrylonitrile and vinyl chloride containing 60% of vinyl chloride.
Polymer B is a copolymer of acrylonitrile and vinyl chloride containing 31% of vinyl chloride.
Polymer C is polyacrylonitrile.
Polymer D is a copolymer of styrene and acrylonitrile containing 28% of acrylonitrile.
Polymer E is polystyrene.
Polymer F is a copolymer of vinyl chloride and vinyl acetate containing 86% of vinyl chloride.
Polymer G is a copolymer of vinyl chloride and vinyl acetate containing 95% of vinyl chloride.

EXAMPLE 8

To 1500 grams of acetone cooled to around −10° C. to −20° C. were added 75 grams of an hydroxyethyl polyvinyl alcohol having a weight ratio of ethylene oxide to polyvinyl alcohol of 13 to 1. Then 425 grams of an acrylonitrile-vinyl chloride copolymer resin containing 60% of vinyl chloride and 10 grams of dioctyl tin maleate as a heat and light stabilizer were mixed therewith. The temperature of the resultant slurry was then slowly raised to about 40° to 50° C. to solvate the resin, thereby yielding a homogeneous solution. This solution was heated to 65° C. in a closed vessel, pumped through a filter, and metered to an 40 hole spinnerette. The spinning solution leaving the spinnerette at a velocity of 71 feet per minute was passed into an aqueous coagulating bath containing around 15% by weight of acetone, and then was taken up on a bobbin at a velocity of 100 feet per minute. After aging the yarn at 50° C. for 16 hours in air to remove residual solvent, two ends of the yarn were plied and stretched 1000% in a steam stretching tube at about 115° C. The stretched yarn then was annealed continuously by exposing it to a temperature of 150° C. for about one second while allowing it to shrink 15%. The resultant 80-filament, 266 denier yarn had a tenacity of 3.2 grams per denier, and an elongation of 24%, respectively. The yarn exhibited excellent dyeing properties, and showed excellent and permanent static resistance even after dyeing, as is indicated in Table XI.

*Table XI*

| Sample No. | Number of times laundered | DCR (ohm cms.) | Charge generation, volts |
|---|---|---|---|
| Control | 5 | 5.0×10¹¹ | >−1,000 |
| (1) | 5 | 6.2×10⁷ | <−100 |
| (1) | 50 | 8.9×10⁸ | −100 |
| (2) | 5 | 6.7×10⁹ | <−100 |
| (2) | 50 | 6.7×10⁸ |  |
| (3) | 5 | 1.2×10⁸ | <−100 |
| (3) | 50 | 8.4×10⁸ | <−100 |

(1) Natural undyed yarn.
(2) Dyed with an acetate dye for 90 minutes in a boiling water dye bath.
(3) Dyed with an acid dye for 90 minutes in a boiling water dye bath.

EXAMPLE 9

A spinning solution was prepared in the general manner described in Example 8, but containing 300 grams of acetone, 85 grams of the resin described in Example 8, 2 grams of dioctyl tin maleate, and 15 grams of an hydroxyethyl polyvinyl alcohol having a weight ratio of ethylene oxide to vinyl alcohol of 10.7 to 1, and a specific viscosity in water at 20° C. of 0.114. Yarn was spun, dried at 50° C. for 16 hours to remove solvent and stretched 1000% in steam at 115° C. The stretched yarn then was dimensionally stabilized by heating for 6 hours untensioned at 110° C. The resultant 80-filament 145 denier yarn containing 15% of the antistatic agent had a tenacity of 3 grams per denier, and an elongation of 25%. The yarn had excellent affinity for both acid-type and acetate-type dyestuffs. These textile articles had excellent static resistance after repeated launderings of both the dyed and the undyed materials, as indicated in Table XII.

*Table XII*

| Sample No. | Number of times laundered | DCR (ohm cms.) | Charge generation, volts |
|---|---|---|---|
| (1) | 5 | 3.3×10⁷ | <−100 |
| (1) | 50 | 4.3×10⁷ | <−100 |
| (2) | 1 | 1.8×10⁸ | −100 |
| (2) | 50 | 9.1×10⁷ | <−100 |
| (3) | 1 | 4.6×10⁸ | <−100 |
| (3) | 50 | 1.9×10⁸ | <−100 |

Sample No. (1) is the natural, undyed material; No. (2) is the same material dyed with an acetate dye for 90 minutes in a 100° C. aqueous dye bath; No. (3) is the same material as (1) but was dyed with an acid dye for 90 minutes in a 100° C. aqueous dye bath.

EXAMPLE 10

At room temperature a slurry was made containing 300 grams of acetonitrile, 87.5 grams of acrylonitrile-vinyl chloride copolymer containing 64% of acrylonitrile in the polymer, 2 grams of dioctyl tin maleate, and 12.5 grams of the hydroxyethyl polyvinyl alcohol described in Example 9. The resultant slurry was solvated by heating with agitation to about 50° C. The solution then was heated in a closed vessel to about 80° C., filtered and pumped to a spinnerette at 70° C. The filaments thus formed were coagulated in a water bath containing 15% by weight of acetonitrile and held at 70 C. The resultant filaments were dried at 50° C. for 16 hours, two ends plied, stretched 1000% in steam at 130° C., and then annealed by heating for one second at 200° C. while permitting 15% shrinkage. The resultant 200-filament, 235 denier yarn containing 12.5% by weight of an hydroxyethyl polyvinyl alcohol had a tenacity of 4.1 grams per denier, 20% elongation, a shrinkage in boiling water and in 150° C. mineral oil of 3.5 and 4.% respectively. It had excellent dye affinity for acid-type and acetate-type dyestuffs in a boiling dye bath. The protection against static electricity and the permanence of such protection were excellent both on dyed and undyed articles, as shown in Table XIII.

*Table XIII*

| Sample No. | Number of times laundered | DCR (ohm cms.) | Charge generation, volts |
|---|---|---|---|
| (1) | 5 | 1.7×10⁸ | <−100 |
| (1) | 50 | 4.2×10⁸ | <−100 |
| (2) | 1 | 4.7×10⁷ | <−100 |
| (2) | 50 | 2.8×10⁸ | <−100 |
| (3) | 1 | 3.8×10⁸ | <−100 |
| (3) | 50 | 9.2×10⁸ | <−100 |
| Control (4) | 1 | 3.1×10¹⁰ | >−1,000 |

Sample No. (1) yarn undyed; No. (2) yarn acetate dyed; No. (3) yarn acid dyed; No. (4) yarn from same resin which did not contain hydroxyethyl polyvinyl alcohol.

EXAMPLE 11

Following the procedure described in Example 10, a spinning solution was prepared containing 300 grams of acetonitrile, 2 grams of dioctyl tin maleate, 85 grams of the resin described in Example 10, and 15 grams of an hydroxyethyl polyvinyl alcohol containing ethylene oxide and vinyl alcohol in the weight ratio of 4.8 to 1, and having a specific viscosity in water at 20° C. of 0.147.

Yarn was spun from this solution, and the yarn was processed as described in Example 10, with the exception that it was stretched 800% in 124° C. steam, and was then annealed by heating for one second at 185° C. while permitting 15% shrinkage. The resultant 200-filament 248 denier yarn contained 15% of the antistatic agent and had a tenacity of 4.6 grams per denier and an elongation of 21%. This textile article had excellent resistance to the development of static electricity, as was indicated by a DCR value of $1.3 \times 10^9$ ohm cms., no charge generation when rubbed over wool flannel, and no dirt pickup even after 50 launderings.

EXAMPLE 12

45 grams of the hydroxyethyl polyvinyl alcohol reaction product of ethylene oxide and polyvinyl alcohol, containing ethylene oxide and polyvinyl alcohol residues in the weight ratio of 1.5 to 1, was dispersed in 900 grams of dimethylformamide at room temperature and then was cooled to −30° C. The hydroxyethyl polyvinyl alcohol was insoluble in acetonitrile but soluble in dimethylformamide. It contained approximately 60% of ethylene oxide and 40% of polyvinyl alcohol, by weight. Then 255 grams of a resinous copolymer of acrylonitrile and vinyl chloride containing 40.1 percent of acrylonitrile and 59.9% vinyl chloride in the polymer and 6 grams of dioctyl tin maleate stabilizer were added thereto and mixed to form a resin slurry. The temperature then was slowly raised to about 50°–60° C. to solvate the resin and form a homogeneous solution. This solution then was heated to 80° C., filtered, and extruded at 85° C. through a spinnerette having 100 holes each 0.1 mm. in diameter. The extruded filaments were coagulated in a dipropylene glycol bath at 90°–100° C., and then were wound on spools and dried for 20 hours at 55° C. Two ends of the yarn were stretched together 1006% while passing through a steam stretching tube held at 117° C.; and then were twisted and annealed at 130° C. for about 0.5 second while permitting 20% shrinkage. The resultant 200-denier, 200-filament yarn had a tenacity of 2.6 grams per denier, an elongation of 23%, and a shrinkage of 9% after 30 minutes in boiling water. This fiber, which contains 15% of the hydroxyethyl polyvinyl alcohol, possessed excellent antistatic properties, as indicated in Table XIV wherein the usual tests for evaluating antistatic protection are given for the above described fiber in comparison with a control fiber prepared in the same manner except that it was spun from an acetone solution, and was coagulated in a water bath, and did not contain hydroxyethylated polyvinyl alcohol. The values are given for the fiber after subjecting the latter to 10 launderings of the type herein described. The control fiber had physical properties similar to those herein recited for the static-inhibited fiber, with the exception of the greater capacity for accumulating static electricity.

*Table XIV*

| Percent HEPVA | Number of times laundered | Electrical resistivity, (ohm cms.) | Charge generation, volts |
|---|---|---|---|
| 0 | 10 | $1.5 \times 10^{11}$ | >−1,000 |
| 15 | 10 | $6.4 \times 10^9$ | −200 |

EXAMPLE 13

Fifteen grams of the hydroxyethyl polyvinyl alcohol condensation product of ethylene oxide and polyvinyl alcohol, containing ethylene oxide and vinyl alcohol residues in the weight ratio of 10 to 1, were mixed at room temperature with 135 grams of polyacrylonitrile (an 0.2% solution of which in dimethylformamide had a specific viscosity of 0.6 at 50° C.), 3 grams of dioctyl tin maleate, and 850 grams of dimethylformamide. The mixture was heated to 90° C. with mixing to obtain a uniform solution. The latter was filtered and extruded through a 240-hole spinnerette with a hole size of 0.07 mm., and the extruded filaments were coagulated in a triethylene glycol bath held at 75° C., washed with 90° C. water, and taken up on a bobbin at the rate of 30 feet per minute. The yarn was dried on the bobbin for 20 hours at 55° C., stretched 1000% in 138° C. steam, and annealed at 260° C. for about 0.5 second while allowing 20% controlled shrinkage.

The resultant 180 denier, 240-filament yarn had a tenacity of 4.2 grams per denier and an elongation of 17%, no shrinkage after 30 minutes exposure in boiling water, and a 2.5% shrinkage at 225° C. This fiber, which contained 10% by weight of the hydroxyethyl polyvinyl alcohol, possessed excellent antistatic properties after 50 home launderings. Thus, samples of knitted fabric made from this yarn did not develop an electrical surface charge or attract dirt particles even after vigorously rubbing such fabric over clean woolen flannel.

The following test procedures are in use for evaluating the extent of the tendency of various hydrophobic resinous materials to develop surface charges of static electricity. These procedures include (1) the measurement of electrical resistivity of the article; (2) the measurement of the charge generation upon the test article upon rubbing with a clean wool flannel; (3) a dirt pickup test; and (4) a permanence test.

In the electrical resistivity measurement, the electrical resistance in ohms of 8 strands of the textile yarn being examined, is measured by being secured between 2 terminal clamps approximately 2 inches apart of an Ultrohmeter manufactured by Beckman Instrument Company, Pasadena, California. The resultant value for resistance is converted to volume resistivity (ohm cms.) employing the following formula:

$$\text{Volume resistivity} = \frac{\text{Resistance} \times \text{weight of fiber between clamps}}{\text{Density of the fiber} \times (\text{distance between clamps})^2}$$

Volume resistivity values of $5 \times 10^9$ ohm cms. or less are desirable for the best static protection. However, values of $5 \times 10^{10}$ ohm cms. or less after twenty or more launderings indicate a substantial degree of antistatic protection afforded the resin article. These values rise as the number of launderings of the article increases.

The charge generation test is conducted by rubbing a sample of the textile fabric approximately 5 inches by 6 inches over a mandrel 3 inches in diameter covered with clean wool flannel. The article then is quickly dropped into an insulated metal beaker connected to a variable capacitance electrostatic voltmeter. The reading in volts is an indication of the static charge residing on the fabric. The fabric is dropped into the beaker after ten rubs over the flannel. It has been found that if the observed voltage does not exceed about 500, the charge level of the fabric is not great enough to cause the fabric to cling to the wearer or to collect and hold dirt particles.

All of the test procedures mentioned herein are run at 76° F. and 50% relative humidity.

The permanence of the antistatic protection is measured by subjecting the test fabrics to the foregoing tests after one or more washings in a commercially available automatic home laundering machine using a commercially available detergent. The samples are conditioned at 76° F. and 50% relative humidity before testing. The tests are repeated after the desired number of launderings.

By the practice of the present invention it is now possible to produce and market textiles made from hydrophobic synthetic resins, the exploitation of which heretofore has been hindered because of the tendency for articles made therefrom to develop objectionable surface charges of static electricity. By the practice of this invention not only can static-resistant articles be made from such synthetic resins but, furthermore, this antistatic protection can be retained by the textile and other articles made therefrom after many launderings and dry cleanings. Still more significant, this antistatic protection can be imparted to textiles made from these resins without substantially sacrificing any of the important physical properties of the textiles, such as tenacity, elongation, dye affinity and so forth, so important to the successful commercial exploitation of such resin textiles.

It is not essential that the hydrophobic resin and the antistatic agent be dispersed in a mutual organic solvent during the production of the spinning dope. Excellent results have been secured where an acetone or an acetonitrile solution of the antistatic agent is metered into the resin spinning dope immediately prior to the extrusion of the filament through the spinnerette. In such case, various pigments, delusterants and flammability controlled materials can be incorporated into the solution of the antistatic agent, and the mixture introduced into the spinning dope at or adjacent the spinnerettes.

The hydroxyalkyl polyvinyl alcohol can be incorporated in the resin spinning solution in a variety of manners, as by mixing the former, the resin and the solvent in a sigma-blade type mixer at elevated temperatures (e. g., 50° C. to 80° C.).

While in the examples a small amount of heat- and light-stablizer for the resin is present in the spinning composition, its presence is not essential. When such a stabilizer is used it is preferred to employ a hydrocarbon tin salt of an alpha, beta-olefinic mono- or di-carboxylic acid, such as those disclosed in the Quattlebaum et al. Patent No. 2,307,157.

This invention is susceptible of modification within the scope of the appended claims.

I claim:

1. A hydrophobic resin composition resistant to the accumulation of charges of static electricity, which comprises essentially a hydrophobic resinous polymer containing at least one member of the class consisting of the homopolymers of acrylonitrile, vinyl chloride, vinylidene chloride and styrene, copolymers of acrylonitrile with at least one member of the class consisting of vinyl chloride, vinyl acetate, vinylidene chloride and styrene; and copolymers of vinyl chloride with vinyl acetate, and an hydroxyethylated polyvinyl alcohol containing ethylene oxide and polyvinyl alcohol residues in a weight ratio within the range between about 1.5 to 1 and about 20 to 1, the hydroxyethylated polyvinyl alcohol forming at least about 5% of the total weight of said polymer and said hydroxyethylated polyvinyl alcohol.

2. A spinnable static-resistant hydrophobic resinous composition essentially comprising a solution in a volatile mutual organic solvent, of a hydrophobic resin and from about 5% to about 20% of a reaction product of the condensation of ethylene oxide and a polyvinyl alcohol in the weight ratio of at least 1.5 to 1, said percentage being based upon the total weight of said resin and said reaction product, and said resin being a member of the class consisting of the homopolymers of acrylonitrile, vinyl chloride, vinylidene chloride and styrene; copolymers of acrylonitrile with at least one member of the class consisting of vinyl chloride, vinyl acetate, vinylidene chloride and styrene; and copolymers of vinyl chloride with vinyl acetate.

3. A spinnable static-resistant hydrophobic resinous composition essentially comprising a solution in a volatile mutual organic solvent, of a resin of the class consisting of the homopolymers of acrylonitrile, vinyl chloride, vinylidene chloride and styrene; copolymers of acrylonitrile with at least one member of the class consisting of vinyl chloride, vinyl acetate, vinylidene chloride and styrene; and copolymers of vinyl chloride with vinyl acetate, said solution also containing from about 5% to about 20% of a hydroxyalkylated polyvinyl alcohol reaction product of the condensation of ethlyene oxide, propylene oxide and polyvinyl alcohol in the weight ratio of at least 1.5 parts of total alkylene oxide per part of polyvinyl alcohol, the hydroxyethyl groups constituting the major portion of the hydroxyalkyl content of said hydroxyalkylated polyvinyl alcohol, and said percentages being based upon the total weight of the said resin and said reaction product.

4. A spinnable, static-resistant hydrophobic resinous composition essentially comprising a solution in dimethylformamide of a hydrophobic resin selected from the class consisting of the homopolymers of acrylonitrile, vinyl chloride, vinylidene chloride and styrene; copolymers of acrylonitrile with at least one member of the class consisting of vinyl chloride, vinyl acetate, vinylidene chloride and stryene; and copolymers of vinyl chloride with vinyl acetate; and as antistatic agent at least about 5%, based upon the total weight of the resin and said agent, of a product of the condensation of ethylene oxide and a polyvinyl alcohol in the weight ratio within the range from about 1.5 to 1 to about 20 to 1.

5. A spinnable, static-resistant hydrophobic resinous composition essentially comprising a solution in acetonitrile of an acetonitrile-soluble resinous copolymer of acrylonitrile and vinyl chloride containing between about 20% and about 75% of acrylonitrile in the polymer, and as antistatic agent at least about 5%, based upon the total weight of the resin and said agent, of a product of the condensation of ethylene oxide and a polyvinyl alcohol in the weight ratio within the range from about 3 to 1 and about 20 to 1.

6. A spinnable, static-resistant hydrophobic resinous composition essentially comprising a solution in acetone of an acetone-soluble resinous copolymer of acrylonitrile with vinyl chloride, and as antistatic agent at least about 5%, based upon the total weight of the resin and said agent, of a product of the condensation of ethylene oxide and a polyvinyl alcohol in the weight ratio within the range from about 7 to 1 and about 20 to 1.

7. A spinnable static-resistant resin composition, essentially comprising a solution in a mutual organic spinning solvent of a resin selected from the class consisting of the homopolymers of acrylonitrile, vinyl chloride, vinylidene chloride and styrene, copolymers of acrylonitrile with at least one member of the class consisting of vinyl chloride, vinyl acetate, vinylidene chloride and styrene; and copolymers of vinyl chloride with vinyl acetate; and at least about 5%, based upon the total weight of the resin and said hydroxyalkylated polyvinyl alcohol, of a hydroxyalkylated polyvinyl alcohol containing alkylene oxide and polyvinyl alcohol residues in a weight ratio within the range between about 1.5 to 1 and about 20 to 1, hydroxyethyl groups constituting the major portion of the hydroxyalkyl content of said hydroxyalkylated polyvinyl alcohol, the balance of said hydroxyalkyl groups being hydroxypropyl groups.

8. Shaped articles containing a resinous vinyl polymer of the class consisting of the homopolymers of acrylonitrile, vinyl chloride, vinylidene chloride and styrene; copolymers of acrylonitrile with at least one member of the class consisting of vinyl chloride, vinyl acetate, vinylidene chloride and styrene; and copolymers of vinyl chloride with vinyl acetate; said article having uniformly distributed therein at least 5% of an hydroxyethylated polyvinyl alcohol, based upon the total weight of the resin and the hydroxyethylated polyvinyl alcohol, the last named compound containing ethylene oxide and polyvinyl alcohol residues in weight ratios within the range from about 1.5 to 1 to about 20 to 1.

9. Shaped articles resistant to the accumulation thereon of charges of static electricity, said articles being formed from acrylonitrile-containing polymers having from about 40% to about 100% of acrylonitrile, any remainder of the polymer being vinyl chloride, the said articles having uniformly distributed therein at least about 5% of any hydroxyethylated polyvinyl alcohol containing at least 1.5 parts by weight of ethylene oxide residues per part of polyvinyl alcohol residues, said percentage being based upon the total weight of said polymer and said hydroxyethylated polyvinyl alcohol.

10. Method for producing static-resistant fibers, filaments, yarns and other shaped articles, which comprises forming such an article from a solution of an hydrophobic vinyl resin in an organic solvent, said resin being at least one member of the class consisting of the homopolymers of acrylonitrile, vinyl chloride, vinylidene chloride and styrene, copolymers of acrylonitrile with at least one member of the class consisting of vinyl chloride, vinyl acetate, vinylidene chloride and styrene; and copolymers of vinyl chloride with vinyl acetate, and said solution also containing as antistatic agent an hydroxyethylated polyvinyl alcohol containing ethylene oxide and polyvinyl alcohol residues in a weight ratio within the range between about 1.5 to 1 and about 20:1, said antistatic agent being present in amount at least 5% of the combined weight of the antistatic agent and the resin.

11. Method for producing static-resistant fibers, filaments, yarns and other shaped articles, which comprises forming such an article from a solution of an hydrophobic vinyl resin in an organic solvent said resin being at least one member of the class consisting of the homopolymers of acrylonitrile, vinyl chloride, vinylidene chloride and styrene, copolymers of acrylonitrile with at least one member of the class consisting of vinyl chloride, vinyl acetate, vinylidene chloride and styrene; and copolymers of vinyl chloride with vinyl acetate, and said solution also containing as antistatic agent an hydroxyethylated polyvinyl alcohol containing ethylene oxide and polyvinyl alcohol residues in the weight ratios within the range between about 1.5 to 1 and about 20 to 1.

12. Method for making static-resistant textile fibers, filaments, yarns, and other textile articles, which comprises spinning a dispersion of an hydrophobic resinous polymer of at least one member of the class consisting of the homopolymers of acrylonitrile, vinyl chloride, vinylidene chloride and styrene; copolymers of acrylonitrile with at least one member of the class consisting of vinyl chloride, vinyl acetate, vinylidene chloride, and styrene; and copolymers of vinyl chloride with vinyl acetate; and an hydroxyethylated polyvinyl alcohol, in a mutual organic solvent for the latter and for said polymer, said hydroxyethylated polyvinyl alcohol containing ethylene oxide residues and polyvinyl alcohol residues in a weight ratio of at least 1.5 to 1.

References Cited in the file of this patent

UNITED STATES PATENTS

| 1,998,544 | Jochum et al. | Apr. 23, 1935 |
| 2,404,714 | Latham | July 23, 1946 |
| 2,496,267 | Chaney | Feb. 7, 1950 |

FOREIGN PATENTS

| 361,691 | Great Britain | Nov. 26, 1931 |